United States Patent [19]

Friede

[11] 4,327,599

[45] May 4, 1982

[54] BLOCKING MECHANISM

[75] Inventor: Patrick W. Friede, Peoria, Ill.

[73] Assignee: Caterpillar Tractor Co., Peoria, Ill.

[21] Appl. No.: 173,928

[22] PCT Filed: Feb. 28, 1980

[86] PCT No.: PCT/US80/00264

§ 371 Date: Feb. 28, 1980

§ 102(e) Date: Feb. 28, 1980

[87] PCT Pub. No.: WO81/02476

PCT Pub. Date: Sep. 3, 1981

[51] Int. Cl.³ .............................................. G05G 5/08
[52] U.S. Cl. ................................. 74/483 R; 137/637.1
[58] Field of Search .............. 74/477, 483 R, 483 PB, 74/483 K, 878; 137/637.1; 192/3.63

[56] References Cited

U.S. PATENT DOCUMENTS

| | | | |
|---|---|---|---|
| 993,372 | 5/1911 | Hipwell | 137/637.1 |
| 1,929,153 | 10/1933 | Sampson | 192/3.63 |
| 2,015,182 | 9/1935 | Hladik | 137/637.1 |
| 2,709,452 | 5/1955 | Calabrese | 137/637.1 |

Primary Examiner—Allan D. Herrmann
Attorney, Agent, or Firm—Wegner, Stellman, McCord, Wood & Dalton

[57] ABSTRACT

A toggle linkage (70) is provided to interact between a pair of levers (50,52) located between a pair of input functions, i.e. a pair of depressible foot treadles (22,24), and a pair of output functions, i.e. control linkages for operating a variable displacement hydraulic machine (31). Each lever (50,52) of the pair of levers is fixed either to a sleeve (58) or to a shaft (63). The toggle linkage (70) includes a bellcrank (72) pivoted about an axis parallel to the axis of the sleeve (58) and shaft (63) and has a pair of abutments or stops (80,84) thereon, each one of which is aligned either with a first one of said levers (50) or with a second one of said levers (52). A link (74) connects a portion of said bellcrank (72) with said second one of said levers (52) limiting the extent of movement of said one of said levers in response to movement of said other of said levers.

10 Claims, 8 Drawing Figures

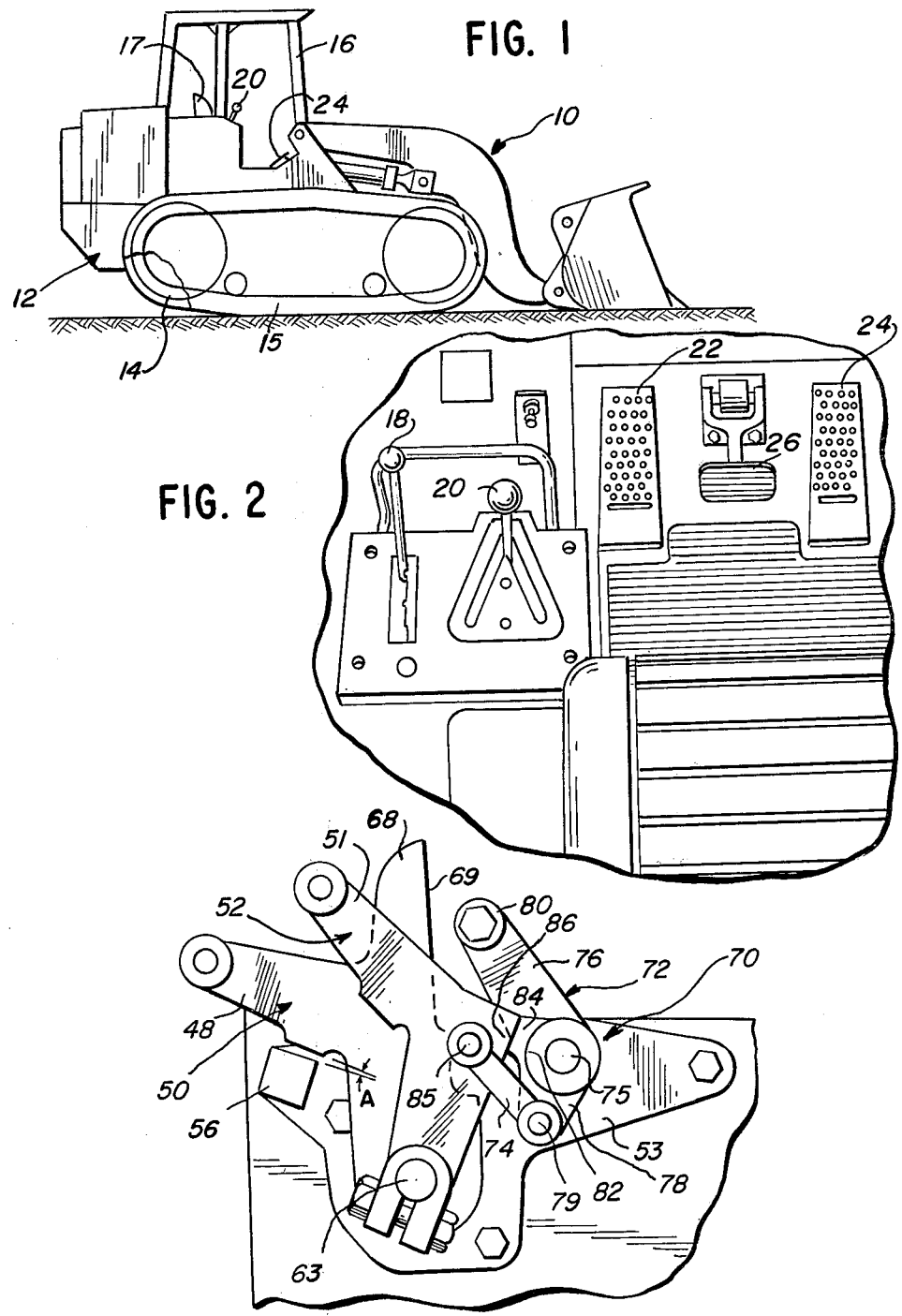

FIG. 4
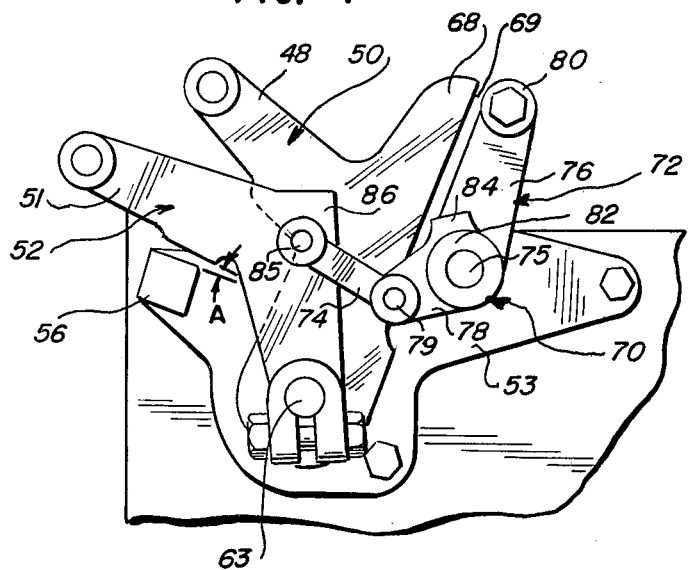
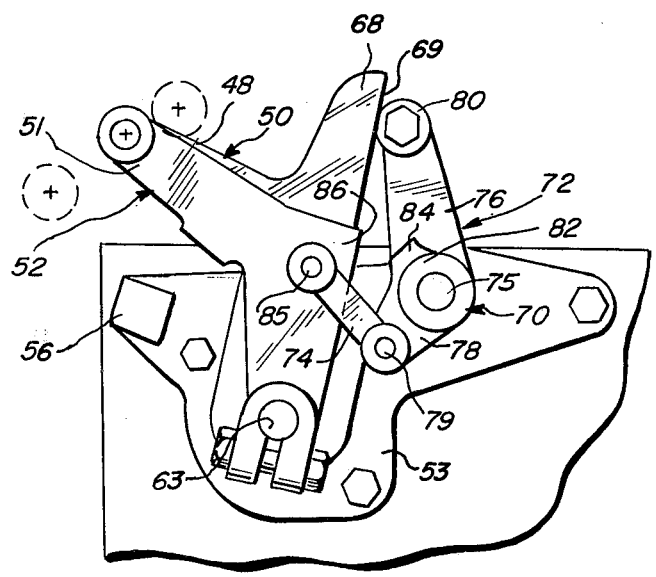
FIG. 5

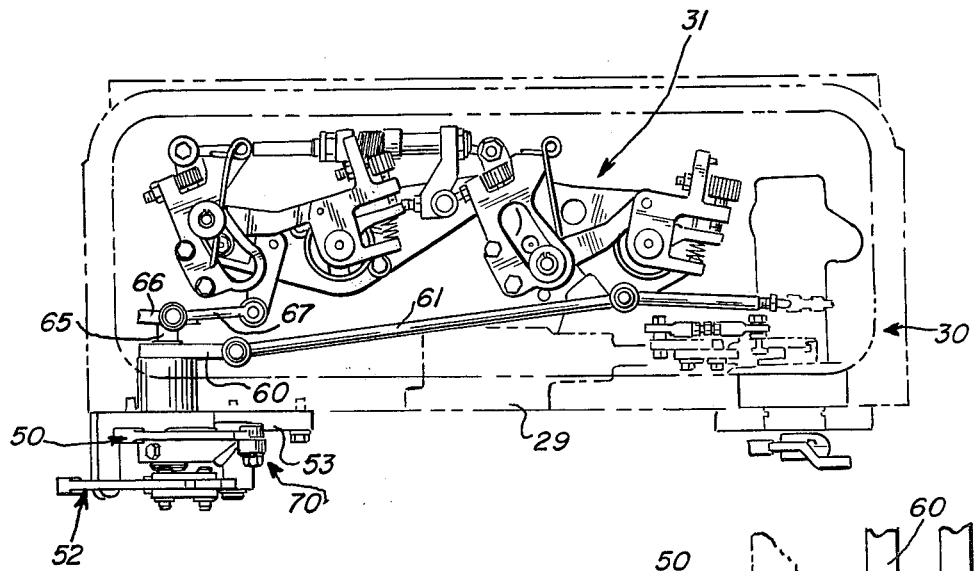
FIG. 6
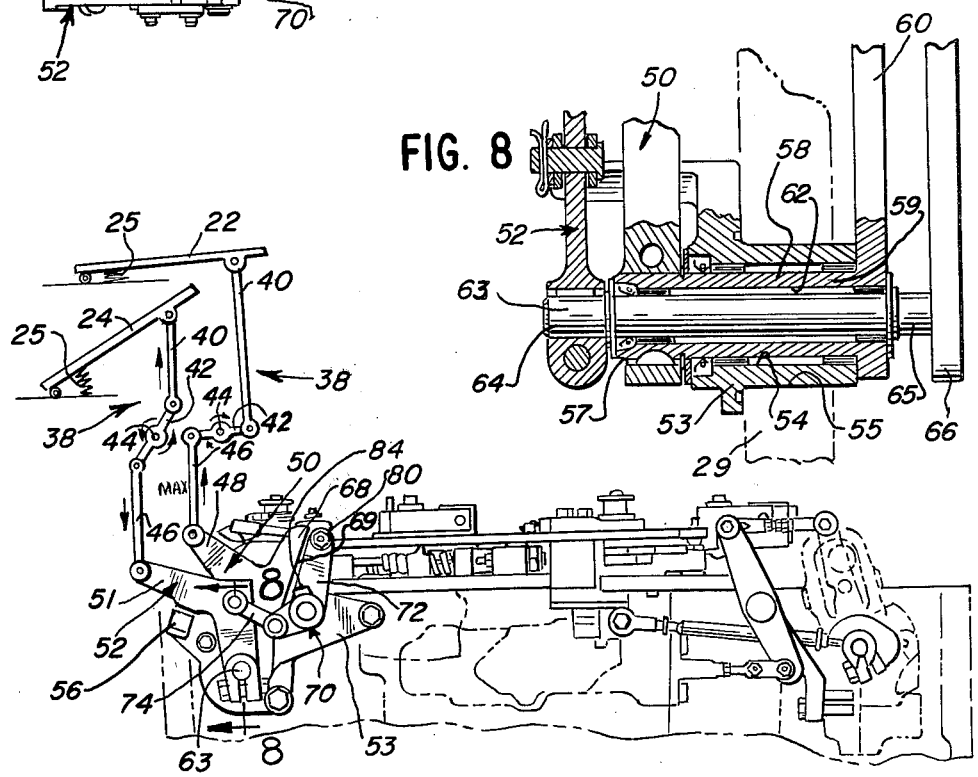
FIG. 8
FIG. 7

BLOCKING MECHANISM

TECHNICAL FIELD

This invention relates to a toggle linkage and, more particularly, to a toggle linkage for interacting between two or more input functions such that actuation of one input function limits the amount of actuation of one or more other input functions.

BACKGROUND ART

Many operating systems use two independently operated actuators to perform equally important, but opposite, functions. As an example, in a hydrostatic transmission for driving a track-type vehicle, two independent foot treadles are provided for stearing the vehicle, one treadle controlling the speed of one track and the second treadle controlling the speed of the other track. When either treadle is in the fully depressed condition, the track controlled by that treadle will reverse for a maximum steer position or a spot turn.

It is undesirable for both treadles to be fully depressed at the same time for this would not steer the vehicle, but instead would result in the direction of drive of the vehicle being reversed.

The present invention is directed to overcoming one or more of the problems as set forth above.

DISCLOSURE OF INVENTION

According to the present invention, a control linkage is connected between a pair of input control functions and a pair of output control functions. A toggle linkage is interposed between two levers of the control linkage so that actuation, to any degree, of one lever automatically limits the degree of actuation permitted the other lever.

The control linkage is mounted on a housing having an opening extending therethrough. A sleeve is pivotally mounted in the opening and is connected to one end portion of a first lever and to a first output control function. The first lever has an attaching portion spaced from said one end portion to which a first input control function is attached so that actuation of the first input control function will pivot the first lever and the sleeve to actuate the first output control function. A pivot shaft is pivotally disposed in the sleeve and is connected to one end portion of a second lever and to a second output control function. The second lever has an attaching portion spaced from said one end portion to which a second input control function is attached so that actuation of the second input control function will pivot the second lever and the pivot shaft to actuate the second output control function.

A toggle link is provided and is comprised of a bellcrank pivoted on said housing and a link extending between one leg of the bellcrank and an intermediate portion of the second lever. The bellcrank has one stop in alignment with the path of movement of the first lever and has a second stop in the path of movement of the second lever. The stops, the bellcrank and the link interact with the two levers so that movement of one lever positions the stop, the bellcrank and the link to limit the extent of movement of the other lever.

The control linkage is described in relation to a pair of control treadles on a hydraulically driven vehicle where turning of the vehicle is accomplished by depressing one or the other or, to varying degrees, both of the treadles. It is undesirable to completely depress both treadles at the same time since to do so would reverse the direction of drive of the vehicle. The improved toggle link assembly interrelates the movement of one treadle to limit the extent of movement of the other treadle.

BRIEF DESCRIPTION OF DRAWINGS

FIG. 1 is an elevational view of a hydrostatically driven vehicle employing the principles of the present invention;

FIG. 2 is a partial view of some of the controls in the cab of the vehicle of FIG. 1;

FIG. 3 is a partial elevational view of the linkage of the present invention with one treadle of FIG. 2 fully depressed;

FIG. 4 is an elevational view of the same linkage as shown in FIG. 3 only with the left treadle fully depressed;

FIG. 5 is an elevational view of the linkage of FIG. 3 only with both the left and right treadles equally depressed;

FIG. 6 is a plan view of a steering control linkage as operated by the linkage of FIGS. 3 through 5;

FIG. 7 is an elevational view, with some parts schematically shown, illustrating the treadles connected to the linkage for driving the steering control apparatus of FIG. 5; and FIG. 8 is a cross-sectional view taken along the line 8—8 of FIG. 7.

BEST MODE FOR CARRYING OUT THE INVENTION

The toggle linkage apparatus of the present invention is shown and described in conjunction with a hydraulically driven track-type vehicle 10 having a frame 12 and a pair of tracks 14 and 15 driven by hydraulic motors, not shown. A cab 16 houses an operator compartment wherein an operator is seated on seat 17 in position to manipulate the hand levers 18 and 20, the steering control treadles 22 and 24, and the brake actuator pedal 26, as best shown in FIG. 2. As is conventional, the lever 18 is a governor control lever. A plurality of positions are provided for the lever 18, such that with the lever in the rearmost position, a high idle setting results. Pushing the lever 18 all the way forward into a shut off detent results in engine shutdown.

Lever 20 is provided for controlling the speed and direction of the vehicle and has the shape of an inverted "V". The frontmost point or apex of the "V" is the neutral position. With the lever 20 in the neutral position, the controls are neutralized and parking brakes are applied. Moving the lever 20 along the right leg of the inverted "V" provides forward vehicle motion, while moving the lever 20 rearward along the outer leg of the "V" provides reverse vehicle motion. Vehicle speed is increased as the control lever is moved toward the rear or open portion of the "V".

Treadles 22 and 24 are provided for steering control of the vehicle. As one treadle is depressed, the speed of the track on that side of the vehicle is proportionally reduced to provide turning of the vehicle in the direction of the side of the vehicle with the slower moving track. As the treadle is further depressed, the track speed is reduced to zero, whereupon further treadle depression will result in reversing the rotation of the track providing a counter-rotating or spot turn capability. Releasing the treadle returns the vehicle to normal operation. Springs 25 are provided for each treadle to urge it to the up or zero steering position, as shown in FIG. 7.

As the brake pedal 26 is depressed, the vehicle speed is reduced from that set by the speed and direction control lever 20 in proportion to the amount of pedal depression. When the pedal 26 is released, the sequence is reversed and the vehicle will return to its preselected speed. When the pedal is fully depressed, the vehicle will be hydrostatically braked to zero speed and the parking brake will be applied.

Referring to FIGS. 6 and 7, a housing 29 for a hydrostatic power control case 30 is shown in dashed lines and supports a modular control assembly 31. A typical modular control assembly is shown and described in U.S. Pat. No. 4,064,766, issued Dec. 27, 1977 to the common assignee of the present application. Each treadle 22, 24 is operatively connected to the modular control assembly 31 by a multiple component linkage 38, part of which is shown schematically in FIG. 7. It is to be understood that the schematic portion of each multiple component linkage is for illustration purposes only. Each multiple component linkage includes a link 40 which is pivotally connected at one end portion to one of the treadles and is pivotally connected at the other end portion to one end portion of a pivoted link 42. The link is pivoted about a pin 44 and has its other end portion pivoted to a second link 46. The second link, which forms part of the multiple component linkage 38 connected to treadle 22, has its other end portion pivotally connected to an outstanding arm 48 of a first lever 50. The second link 46, which forms part of the multiple component linkage 38 connected to treadle 24, has its other end portion pivotally connected to an extended arm 51 of a second lever 52. As best illustrated in FIG. 8, a bracket 53 is bolted to the housing 29 and has an apertured hub 54 extending through an opening 55 in said housing 29. The bracket 53 has a lug rest 56 against which the arm 48 of lever 50 and the arm 51 of lever 52 normally rest during the initial assembly process.

The first lever 50 has one end portion, remote from the arm 48, clamped rigidly to a one end portion 57 of a sleeve 58 (see FIG. 8) which is rotatably mounted in the apertured hub 54 of the bracket 53. Another end portion 59 of sleeve 58 has an arm 60 which is connected to one end of an actuator rod 61 of the modular control assembly 31. The sleeve 58 includes a bore 62 having a shaft 63 rotatably mounted therein; the shaft further having first and second ends 64, 65, the first end 64 extending beyond the sleeve 58 and having the second lever 52 secured thereto. The second end 65 extends beyond the sleeve 58 and arm 60 and is rigidly connected through an arm 66 to an actuator rod 67 of the modular control assembly 31. The lever 50 has an ear 68 projecting in a radial direction from the shaft 63, with one edge 69 of said ear 68 being substantially straight and facing away from the arm 48.

A toggle linkage assembly 70 is operatively mounted on the bracket 53 and includes lever means, for example, a bellcrank 72 and a link 74. The bellcrank 72 is pivotally mounted to the bracket 53 by a pin 75 with the axis of the pin 75 lying parallel to the axis of the pivot shaft 63 so that the bellcrank 72 rotates in a plane transverse to the axis of the pin 75 and to the axis of the shaft 63. The bellcrank 72 has a long leg 76 on one side of the pivot pin 75 and a short leg 78 on the other side thereof with the link 74 being pivotally connected by a pin 79 to the outer end of said short leg 78. The long leg 76 of bellcrank 72 has a transversely projecting roller or a first stop member 80 affixed thereto with the roller 80 intersecting the plane of the lever 50 and lying in the path of movement of the edge 69 of the ear 68 on said lever 50. An intermediate pivot portion 82 of the bellcrank 72 has an abutment or a second stop member 84 facing toward the lever 52 and intersecting the plane of lever 52. The link 74 had the end portion remote from the pin 79 pivotally connected by pin 85 to an intermediate or knee portion 86 of the lever 52.

INDUSTRIAL APPLICABILITY

As described briefly above, the normal operation of the vehicle with the treadles 22 and 24 in the fully up position, the hydraulic motors will drive the tracks 14 and 15 of the vehicle at equal speeds so that the vehicle will follow a straight path at the speed established by the setting of the governor and speed control levers 18 and 20, respectively. To effect steering of the vehicle, for instance a right turn, the treadle 24 is depressed which will pivot the lever 52 in a clockwise direction which will move the rod to control the amount of fluid directed to an appropriate hydraulic motor with the depression of the treadle 24 reducing the amount of fluid so as to slow down the speed that track 15 on the right side of the vehicle is being driven. Since the left-hand track 14 of the vehicle is still operating at normal speed, the vehicle will turn to the right. The more the right treadle is depressed, the more the amount of fluid to the motor is reduced until the right track is receiving no drive flow. Further depressing the treadle to the fully depressed state will reverse the direction of drive of the right track, thereby creating a condition called a counter-rotation or spot turn of the vehicle. As shown in FIG. 4, the toggle linkage assembly 70 prevents depressing treadle 22 while treadle 24 is fully depressed. Releasing the foot on the right treadle 24 will return the lever 52 to the maximum speed position in close proximity to lug rest 56 on the bracket 53. For example, in practice, the angle A between the rest 56 and the levers 50 and 52 have been found to be in the range of approximately 0° to approximately 5.5°, preferably approximately 2.5°. A similar operation takes place for a left turn of the vehicle.

FIGS. 3, 4 and 5 illustrate three typical operating positions of the toggle linkage assembly 70. Referring specifically to FIG. 3, the left treadle 22 connected to the lever 50 is in the fully up position while the right treadle 24 connected to the lever 52 has been fully depressed which has pivoted the lever 52 and pivot shaft 63 in a clockwise direction with the knee 86 of the lever 52 bearing against the stop 84 to prevent further depressing of the treadle 24 and further clockwise movement of the lever 52. Pivoting the lever 52 has moved the link 74 and has pivoted the bellcrank 72 in a counterclockwise direction about the pivot pin 75. In the extreme position illustrated in FIG. 3, the stop 84 has engaged the knee 86 of lever 52 and the roller or stop 80 has been moved in a counterclockwise direction toward the edge 69 of ear 68 of the lever 50 so that if the operator tried depressing treadle 22 so as to pivot the lever 50 in a clockwise direction, he would only be able to depress the treadle a limited amount before the upstanding ear 68 of the lever 50 contacted the stop 80 which would prevent further movement of the lever 50.

FIG. 4 illustrates the situation where the treadle 22 is fully depressed and the treadle 24 is fully up. The lever 50 is pivoted in the fully clockwise position with the ear 68 in substantially close proximity to the stop or roller 80. With the treadle 24 fully up, the lever 52, as hereinbefore described, will be in the maximum speed position in substantially close proximity to the lug rest 56, depending upon the linkage tolerances and adjustment. Any attempt by the operator to depress the treadle 24 will move the lever 52 in a clockwise direction, which motion, in turn, will be transmitted via link 74 to the bellcrank 72 until the stop 80 contacts the ear 68. Thus, it can be seen that only a relatively small, limited movement of treadle 24 can occur, which in turn, is reflected into a relatively slight reduction in the right-hand track speed. Any attempt by the operator to further depress the treadle 24 will be prevented by the toggle linkage assembly 70.

FIG. 5 illustrates the situation where both treadles 22 and 24 have been depressed an equal amount. That is, depressing the treadle 24 about half-way will pivot the link 74 and bellcrank 72 about the pin 75 to move the roller or stop 80 in a counterclockwise direction. In that position, it is possible to depress the treadle 22 to pivot the lever 50 in a clockwise direction until the ear 68 on the lever 50 engages the roller or stop 80. It should be noted that with the treadles depressed an equal amount and the toggle linkage positioned as illustrated in FIG. 5, there is a limited amount of flow of hydraulic fluid to the track drive motors. However, the flow is so limited that it is insufficicnet to drive the tracks, and the vehicle will have no forward driving force. Further, if greater force is placed on one treadle than on the other treadle, the treadle with the greater force will be depressed, but the other treadle will be raised, thereby placing one track in the reverse mode of operation and increase the speed of the other track as the other treadle is forced to its maximum speed position.

The toggle linkage assembly 70 has been described herein with respect to a hydraulically driven vehicle, but has many applications beyond the application described and is usable in any situation where it is unwanted or undesirable to fully actuate two simultaneous functions. In those cases, the toggle linkage assembly 70 can be incorporated to interlock the two functions so that only one can be put in a maximum condition, while the other is in a reduced setting position. Any positions intermediate the extreme conditions will proportionately allow simultaneous actuation of the two levers.

Other aspects, objects and advantages of this invention can be obtained from a study of the drawings, the disclosure and the appended claims.

I claim:
1. A control linkage comprising:
   the bracket (53) having an apertured hub (54) extending therethrough;
   a sleeve (58) pivotally mounted in said hub (54);
   a first lever (50) having one end portion fixed on said sleeve (58), said first lever (50) having an attaching portion (48) spaced from said one end portion;
   a pivot shaft (63) pivotally disposed in said sleeve (58);
   a second lever (52) having one end portion fixed on said pivot shaft (63), said second lever (52) having an attaching portion (51) spaced from said one end portion;
   means (38) for connecting a pair of input functions to said attaching portions (48,51);
   means (61,67) for connecting a pair of output functions to said sleeve (58) and to said pivot shaft (63);
   a toggle linkage assembly (70) including,
   lever means (72) having an intermediate portion (82) pivotally mounted to said bracket (53), a first leg (76), and a second leg (78), the first leg (76) being longer than the second leg (78) and having first stop means (80) secured thereto in alignment with the path of movement of the first lever (50), second stop means (84) on said lever means (72) in alignment with the path of movement of said second lever (52), and
   link means (74) extending between a mid-portion (86) of the second lever (52) and a shorter leg (78) of said lever means (72) limiting the extent of movement of said one of said levers (50,52) in response to movement of said other of said levers (50,52).

2. A control linkage as claimed in claim 1 wherein said lever means (72) is a bellcrank (72).

3. A control linkage as claimed in claim 2 wherein said first stop means (80) is a roller (80) projecting sidewardly from the plane of said bellcrank (72) and said second stop means (84) is an abutment (84) projecting from the pivoted intermediate portion (82) of said bellcrank (72).

4. A control linkage as claimed in claim 2 wherein said first lever (50) has an ear (68) in the plane of said first lever (50) extending radially outward from the pivoted end portion thereof, said ear (68) having an edge (69) lying in the plane of movement of said first lever (50), said first stop means (80) on said bellcrank (72) being in substantially close proximity to said edge (69) of said ear (68) when said first lever (50) is fully pivoted in a clockwise direction.

5. A control linkage for connecting a pair of input control functions to the pair of output control functions comprising:
   a housing (29) between said input functions and said output functions and having an opening (55) therethrough;
   a first lever (50) having one end portion fixed on a sleeve (58) that is pivotally disposed in said opening (55), an attaching portion (48) on said first lever (50) spaced from said one end portion, said attaching portion (48) being connected to one of said input control functions, said sleeve (58) being connected to one of said output control functions;
   a second lever (52) having one end portion fixed on a pivot shaft (63) that is pivotally disposed in said sleeve (58), an attaching portion (51) on said second lever (52) spaced from said one end portion, said attaching portion (51) being connected to the second of said input control functions, said pivot shaft (63) being connected to the second of said output control functions;
   a bellcrank (72) having an intermediate portion (82) pivotally mounted to a pivot (75) on said housing (29), a first leg (76), and a second leg (78), the first leg (76) being longer than the second leg (78) and having first stop means (80) secured thereto in alignment with the path of movement of the second lever (50), first stop means (84) on said bellcrank (72) in alignment with the path of movement of said second lever (52); and
   link means (74) extending between a mid-portion (86) of the second lever (52) and a shorter leg (78) of said bellcrank (72) limiting the extent of movement of said one of said levers (50,52) in response to movement of said other of said levers (50,52).

6. A control linkage as claimed in claim 5 wherein means (68) project from said first lever (50) in alignment with said first stop means (80) for engaging with said first stop means (80) upon movement of either said first lever (50) to an extreme position, or upon relative movement of both levers (50,52).

7. A control linkage as claimed in claim 5 wherein a bracket (53) is mounted on said housing (29) and has a hub (54) extending through said opening (55) in the housing (29), said sleeve (58) being rotatably mounted in said hub (54).

8. A control linkage as claimed in claim 5 wherein said first stop means (80) is a roller (80) projecting sidewardly from the plane of said bellcrank (72) and said second stop means (84) is an abutment (84) projecting from the pivoted intermediate portion (82) of said bellcrank (72).

9. In a control linkage for connecting a pair of input control functions (22,24) to the valves of a pair of variable displacement hydraulic machines, the improvement comprising:

a bracket (53) carried by a housing (29) supporting said valves, said bracket (53) having an apertured hub (54) extending through an opening (55) in said housing (29);

the first lever (50) having one end portion fixed on a sleeve (58) that is pivotally disposed in said hub (54), means (67) connecting said sleeve (58) to one of said variable displacement machines, an attaching portion (48) on said first lever (50) spaced from said one end portion, said attaching portion (48) being connected to one of said input control functions (22), an ear (68) on said lever (50) having an edge (69) facing away from said attaching portion (48);

a second lever (52) having one end portion fixed on a pivot shaft (63) that is pivotally disposed in said sleeve (58), means (61) connecting said pivot shaft (63) to the other of said variable displacement machines, an attaching portion (51) on said second lever (52) spaced from said one end portion, said attaching portion (51) being connected to the second of said input control functions (24), the improvement comprising:

a toggle linkage assembly (70) including, lever means (72) having an intermediate portion (82) pivotally to said bracket (53), a first leg (76), and a second leg (78), the first leg (76) being longer than the second leg (78) and having first stop means (80) secured thereto in alignment with the path of movement of the first lever (50), second stop means (84) on said bellcrank (72) in alignment with the path of movement of said second lever (52), and link means (74) extending between a mid-portion (86) of the second lever (52) and a shorter leg (78) of said lever means (72) limiting the extent of movement of said one of said levers (50,52) in response to movement of said other of said levers (50,52).

10. A control linkage as claimed in claim 9 wherein said lever means (72) is a bellcrank (72).

* * * * *